(12) United States Patent
Siraj et al.

(10) Patent No.: US 12,009,979 B2
(45) Date of Patent: Jun. 11, 2024

(54) SECURE AND ADAPTIVE MECHANISM TO PROVISION ZERO- TOUCH NETWORK DEVICES

(71) Applicant: HEWLETT PACKARD ENTERPRISE DEVELOPMENT LP, Houston, TX (US)

(72) Inventors: Mohd Shahnawaz Siraj, Santa Clara, CA (US); Rahul Bahal, Santa Clara, CA (US); Kannan Konath, Santa Clara, CA (US); Hao Lu, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 4 days.

(21) Appl. No.: 17/729,487

(22) Filed: Apr. 26, 2022

(65) Prior Publication Data

US 2023/0344715 A1 Oct. 26, 2023

(51) Int. Cl.
*H04L 41/08* (2022.01)
*H04L 9/40* (2022.01)
*H04L 41/0806* (2022.01)
*H04W 84/12* (2009.01)

(52) U.S. Cl.
CPC ...... *H04L 41/0886* (2013.01); *H04L 41/0806* (2013.01); *H04L 63/0876* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 10,447,683 B1* | 10/2019 | Loladia | H04W 12/71 |
| 11,558,187 B2* | 1/2023 | Kumar | H04L 9/0861 |
| 11,658,867 B1* | 5/2023 | Kushwaha | H04L 41/0894 |
| | | | 709/224 |
| 2016/0323689 A1* | 11/2016 | Goluboff | H04L 63/0823 |
| 2017/0171196 A1* | 6/2017 | Britt | H04L 63/0876 |
| 2018/0116004 A1 | 4/2018 | Britt et al. | |
| 2018/0375665 A1 | 12/2018 | Contenti et al. | |
| 2019/0116087 A1* | 4/2019 | Hiller | H04W 4/70 |

* cited by examiner

*Primary Examiner* — Scott B Christensen
(74) *Attorney, Agent, or Firm* — Sheppard Mullin Richter & Hampton LLP

(57) ABSTRACT

Systems and methods are provided for zero-touch provisioning of devices, such as sensors, on a network. When a device is unable/cannot access a network via Ethernet, cellular, or near field communications capabilities resident on the device, the device can alternatively be provisioned via an intermediate network device, such as an access point using, e.g., Device Provisioning Protocol or Wi-Fi Easy-Connect. A cloud-based network management system may receive a device's bootstrapping information during or after manufacturing of the device. Ultimately, the device, via the intermediate network device, is able to communicate with a back-end, cloud-based network insight system from which configuration parameters for the device may be obtained.

18 Claims, 9 Drawing Sheets

SECURE AND ADAPTIVE MECHANISM TO PROVISION ZERO- TOUCH NETWORK DEVICES

BACKGROUND

The Internet of Things (IoT) can refer to a system or network of devices or items that are provided with unique identifiers that allow them to transfer data over a network. These objects may be embedded with sensors that enable these objects to collect and exchange data. For example, one IoT model connects headless sensors over wireless connections to a cloud service that manages the headless sensors and collects traffic. The wireless connections may be established, for example, over a wireless local area network (WLAN) such as a Wi-Fi® network.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
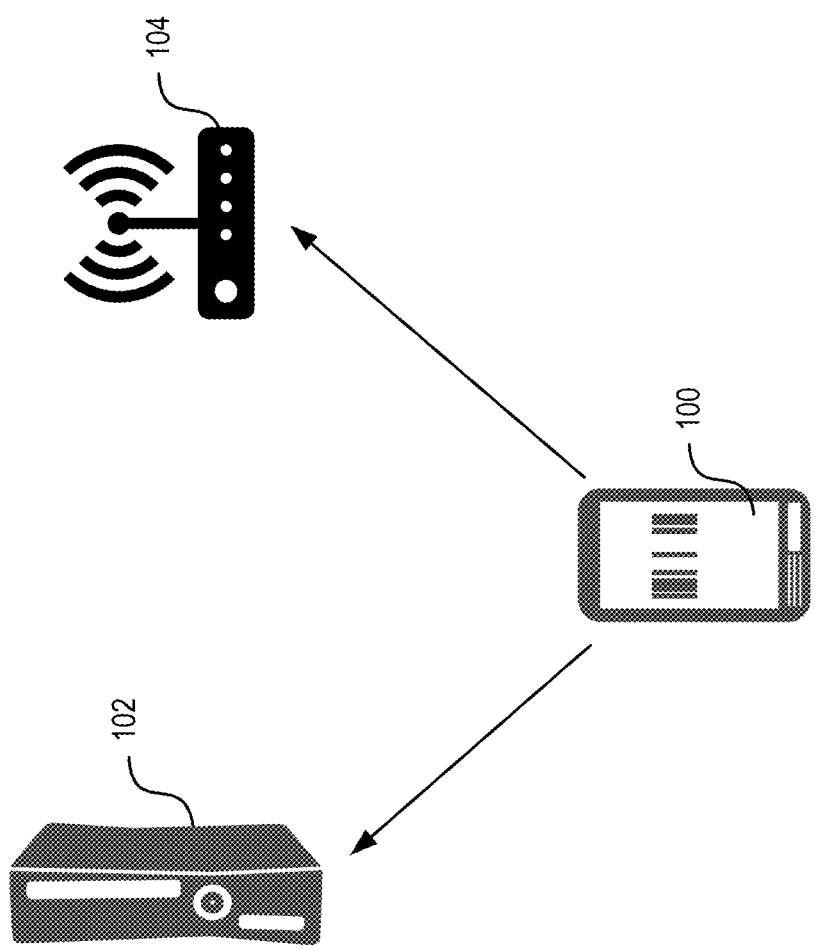
FIG. 1 illustrates an example of Device Provisioning Protocol (DPP) provisioning scenario.

The figures are not exhaustive and do not limit the present disclosure to the precise form disclosed.

DETAILED DESCRIPTION

As noted above, devices such as sensors or devices having sensors embedded therein may connect to an IoT (or other) network via a WLAN, such as a Wi-Fi® network. WLANs, especially enterprise WLANs are often configured to be very secure, minimizing open-authentication APs, implementing Wi-Fi® Protected Access (WPA) authentication and encryption protocols, etc. For example, in order for a sensor to connect to its service in the cloud, the sensor may communicate over a Wi-Fi® network, and thus is configured to connect to the Wi-Fi® network through network discovery (e.g., by a Wi-Fi® network's service set identifier (SSID), authentication credentials (e.g., Wi-Fi® network-specific passwords, such as a pre-shared key or WPA authentication), and the identity of the sensor (e.g., a user ID, Media Access Control (MAC) address, or X.509 certificate).

Some sensors may be configured to operate in conjunction with or under the purview of a network insight system that can be cloud-based. Given that these sensors are part of a cloud-based network insight system, such sensors may establish wireless connections to/from the network insight system, which in turn may wirelessly connect to a network insight dashboard system. That is, the network insight system may be a "backend" system, and the network insight dashboard system may be a "frontend" system. The network insight system may communicate with remotely located sensors to send sensors configuration information or other data associated with or controlling operation of the sensors. The network insight dashboard system may receive information or data gleaned by the sensors regarding one or more aspects of a network in which the sensors have been installed as a result of the sensors monitoring or testing aspects of the network, applications running on the network, etc. A user may then view or obtain such information or data via the network insight dashboard system. Parameters (e.g., operating parameters) or information regarding configuration of the sensor may be set forth using the network insight dashboard system.

It should be noted that disclosed examples can be applied to any system having a need to gather some information or execute some operations through an edge WLAN system. For example, a temperature monitoring system may rely on the WLAN network to communicate with those temperature sensors, an examples of the disclosed technology can assist in onboarding those end-user devices to a DPP-capable network with better user-experience, and without compromising security.

Conventional provisioning methods or mechanisms, such as the Device Provisional Protocol (DPP) or Wi-Fi® Easy Connect™ (which are non-limiting examples) may not be able to onboard sensors that are zero-touch, or if possible, nevertheless result in difficulties. For example, DPP refers to a mechanism promulgated by the Wi-Fi® Alliance for allowing a user's smartphone to bring a new IoT device, such as the aforementioned sensor onto an IoT network. DPP provisioning can encompass four processes: bootstrapping, authentication, configuration, and network discovery. Security can be maintained by keeping the new IoT device's credentials hidden and encrypted over the air. However, in an enterprise network, there are large numbers of APs, IoT devices, as well as other Wi-Fi® clients that may be located at different sites. Thus, the traditional manner in which DPP's provisioning process is implemented to onboard devices to a network, i.e., obtaining each IoT devices' bootstrapping information, provisioning each IoT device one by one, maintaining the smartphone or other configuring device, etc., can be a cumbersome and tedious process. Moreover, the manner in which bootstrapping information should be obtained is not defined by DPP, and is only made more difficult in the context of cloud-controlled sensors that need to communicate with a cloud-based sensor control (backend) system.

Accordingly, various embodiments described in the present disclosure implement a method or mechanism to push device, e.g., sensor, bootstrapping information to necessary network elements so that a sensor deployed in a network may obtain access to a DPP-over-Wi-Fi® network. Such Wi-Fi® connectivity may be used by the sensor to connect to the aforementioned cloud-based network insight (backend) system. Upon establishing a connection to the cloud-based sensor control system, the sensor may obtain whatever configuration information/data needed to effectuate testing or monitoring of the network in order to gain insight into the workings in/on the network. Additionally, the sensor may have a path to communicate the information it has gleaned regarding the network back to the network insight dashboard system. The sensor is able to do this without necessarily having or using any wired, cellular, or near field communications mechanisms (nor does the sensor experience the typical challenges associated with the use of such mechanisms). The sensors may be authenticated or authorized for use in the network in some embodiments using the same communications mechanisms to exchange authentication or authorization information/messaging. Furthermore, the typical need for a separate configurator device, such as a smartphone, to obtain sensor bootstrapping information may also be negated. On the other hand, when a sensor does have options for provisioning a sensor using DPP-over-Ethernet (or over Bluetooth®/near field mechanism, or cellular), the disclosed technology can effectuate adaptive selection of an appropriate network communications mechanism depending on a particular sensor deployment. Further still, cloud-based authentication of sensors can be implemented in accordance with some embodiments so that only desired/allowed sensors may be deployed in a network and onboarded/configured to operate as desired.

FIG. 1 illustrates an example DPP provisioning scenario in which a mobile device 100, such as a smartphone, acts as a traditional configurator for one or more IoT devices or Wi-Fi® clients (also referred to herein as enrollees). In the example illustrated by FIG. 1, an IoT device 102 may be one such enrollee. The objective of DPP is to achieve secure onboarding of devices, such as IoT devices. To that end, DPP-relevant information may be exchanged between one or more enrollees, in this case IoT device 102 and WLAN AP 104, and a configurator, in this case, mobile device 100.

The configurator typically configures each enrollee with credential information, as well as information that allows each enrollee to discover a network in which it is to operate. Any enrollee provisioned by the same configurator should be able to establish a secure connection with each other. As illustrated in FIG. 1, both IoT device 102 and WLAN AP 104 are provisioned by mobile device 100 acting as a configurator. Accordingly, IoT device 102 and WLAN AP 104 should be able to communicate with each other.

In particular, mobile device 100, acting as a configurator, may engage in DPP bootstrapping, DPP authentication, and DPP configuration. DPP bootstrapping may include transferring public key credentials from a transmitting entity (here, IoT device 102 and WLAN AP 104) to a relying entity (here, mobile device 100) in a manner that allows for the establishment of trust by the relying entity. Public key credentials may include a public bootstrap key shared by a configurator and enrollee, which can be used for initial authentication purposes or in some cases, for generating a temporary provisioning key. Bootstrapping can refer to obtaining or receiving the public bootstrap key out-of-band, which generally means that the configurator is physically proximate to or associated with the enrollee, thereby engendering the aforementioned trust.

In order to receive or obtain bootstrapping information, mobile device 100 may scan Quick Response (QR) codes that encrypt the public key credentials associated with each of IoT device 102 and WLAN AP 104. This may be useful when an enrollee does not have a user interface that can be used to authenticate itself with a configurator. Another way in which public key credentials may be exchanged is through Near-Field Communications (NFC), Bluetooth Low Energy (BLE) or other communications protocol or mechanism that can be trusted with maintaining the integrity of the public key credentials during the exchange.

DPP authentication may involve using a trusted public key to allow a configurator to perform strong authentication of an enrollee. For example, mobile device 100 may generate a symmetric key based on a shared secret that can be derived from hashing the bootstrap information. Mobile device 100 may also transmit a DPP authentication request message to IoT device 102 and WLAN AP 104, where the DPP authentication request message comprises the shared secret and, e.g., a first nonce encrypted by the first symmetric key. Upon receipt of the DPP authentication request message by the IoT device 102 and WLAN AP, each of IoT device 102 and WLAN AP 104 checks to see if a hash of its public bootstrap key is included in the DPP authentication request message. If so, IoT device 102 and WLAN AP 104 can derive the first symmetric key, which can be used to obtain the first nonce. IoT device 102 and WLAN AP 104 may each generate a second nonce, a shared secret, and a second symmetric key, wrapping the first and second nonces along with their respective capabilities in the first symmetric key. Moreover, each of IoT device 102 and WLAN AP 104 may wrap an authenticating tag in the second symmetric key, place a hash of its public bootstrap key, among other information including the wrapped authentication tag in DPP response message that is returned to mobile device 100. Mobile device 100 can validate the DPP response message and transmit a DPP authentication confirmation message to each of IoT device 102 and WLAN AP 104.

Following DPP authentication, mobile device 100 may configure each of IoT device 102 and WLAN AP 104 for communications between it and other network devices, as well as for communications between it and infrastructure devices, e.g., one or more APs. It should be noted that APs are also enrollees. IoT device 102 and WLAN AP 104 may each enter into DPP configuration mode by sending a DPP configuration request message to mobile device 100. Mobile device 100 responds with a DPP configuration response message, which can be used to provision IoT device 102 and WLAN AP 104 with the requisite configuration information needed for IoT device 102 and WLAN AP 104 to establish secure access/communications with the network. As will be discussed in greater detail below, embodiments of the disclosed technology can engage in adaptive or automated selection of communication mechanisms for a device, including the use of DPP-over Wi-Fi®, -over Ethernet, -over cellular, etc.

Figure 2:
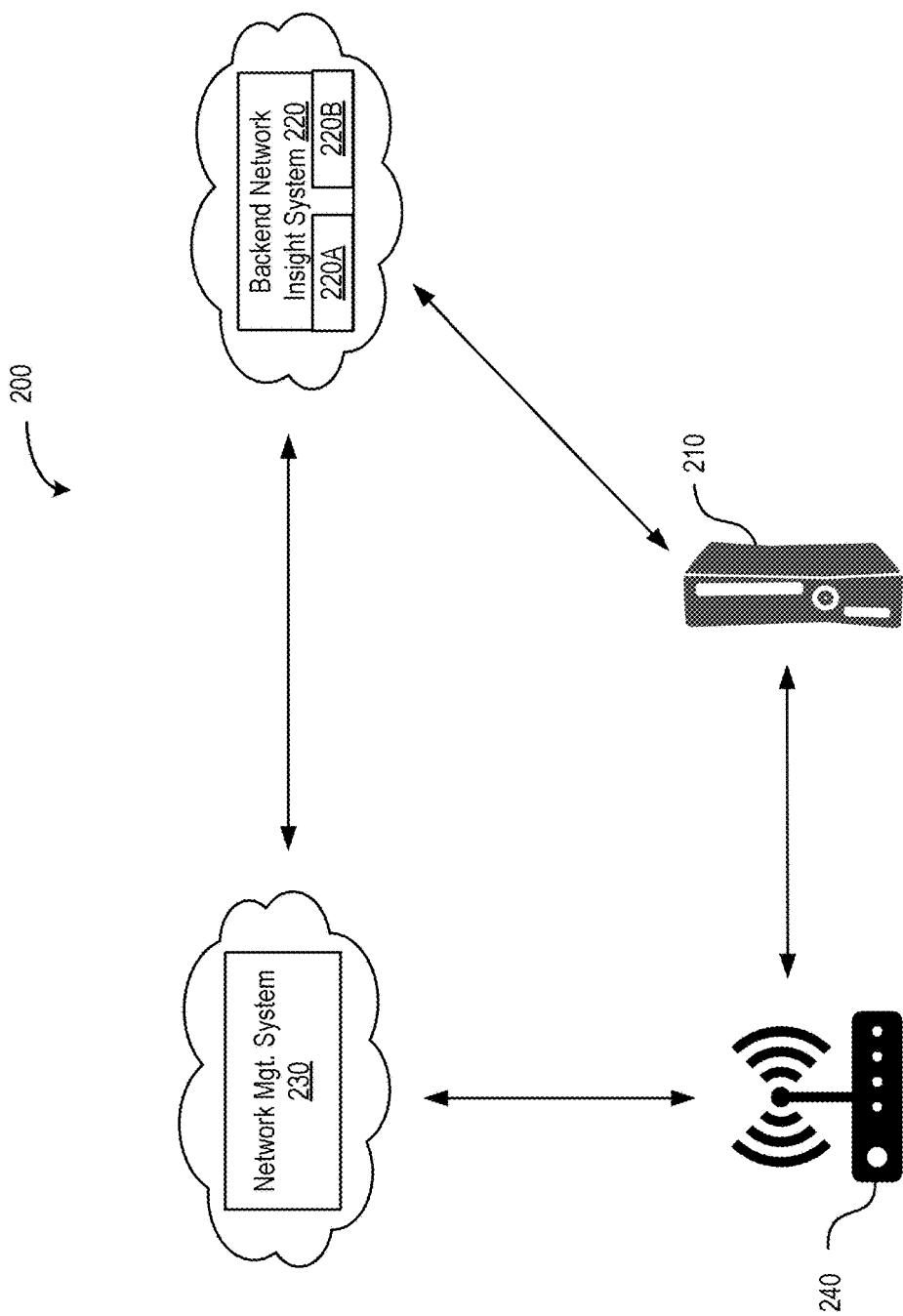
FIG. 2 illustrates an example system architecture (and corresponding high-level workflow) in which embodiments of the present disclosure may be implemented.

FIG. 2 illustrates an example system architecture (and corresponding high-level workflow) in which embodiments of the present disclosure may be implemented. FIG. 2 includes a sensor 210. In some embodiments, sensor 210 may be an IoT sensor (although the applicability of embodiments is not limited to just IoT sensor systems). Sensor 210 may be an embodiment of IoT device 102 (FIG. 1), and may operate to, after installation, monitor the network in which it is installed, as well as perform testing of the network. It should be understood that the network itself can be monitored/tested as well as aspects or elements making up the network, applications or services running on the network, etc.

FIG. 2 also includes a backend network insight system 220 that may communicate with sensor 210. Backend network insight system 220 may reside in a public, private, or hybrid cloud, and can be implemented as a controller, an independent server, an independent micro service running on a cloud platform, or running on a traditional, independent server. A public cloud may share publicly available resources/services over, e.g., the Internet, while a private cloud is not shared and may only offer resources/services over a private data network. A hybrid cloud may share services between public and private clouds depending on the purpose of the services. Backend network insight system 220 and sensor 210 may communicate under various circumstances. Backend network insight system 220 may transmit test protocols in the form of configuration information to sensor 210 so that sensor 210 may have the requisite information or instructions for monitoring or testing its network. In turn, sensor 210-relevant information, such as data or information sensor 210 has obtained from its network, may be transmitted to backend network insight system 220. Backend network insight system 220 may be cloud-based, which would be understood by those of ordinary skill in the art to refer to being, e.g., remotely hosted on a system/servers in a network (rather than being hosted on local servers/computers) and remotely accessible. Such a cloud-based system allows the system to be accessible from a variety of places, not just where the system is hosted. Thus, a user, using a mobile device may have access to a remote network's operating state. It should be noted that the backend network insight system 220 need not reside on the same network in which sensor 220 is installed.

Figure 7:
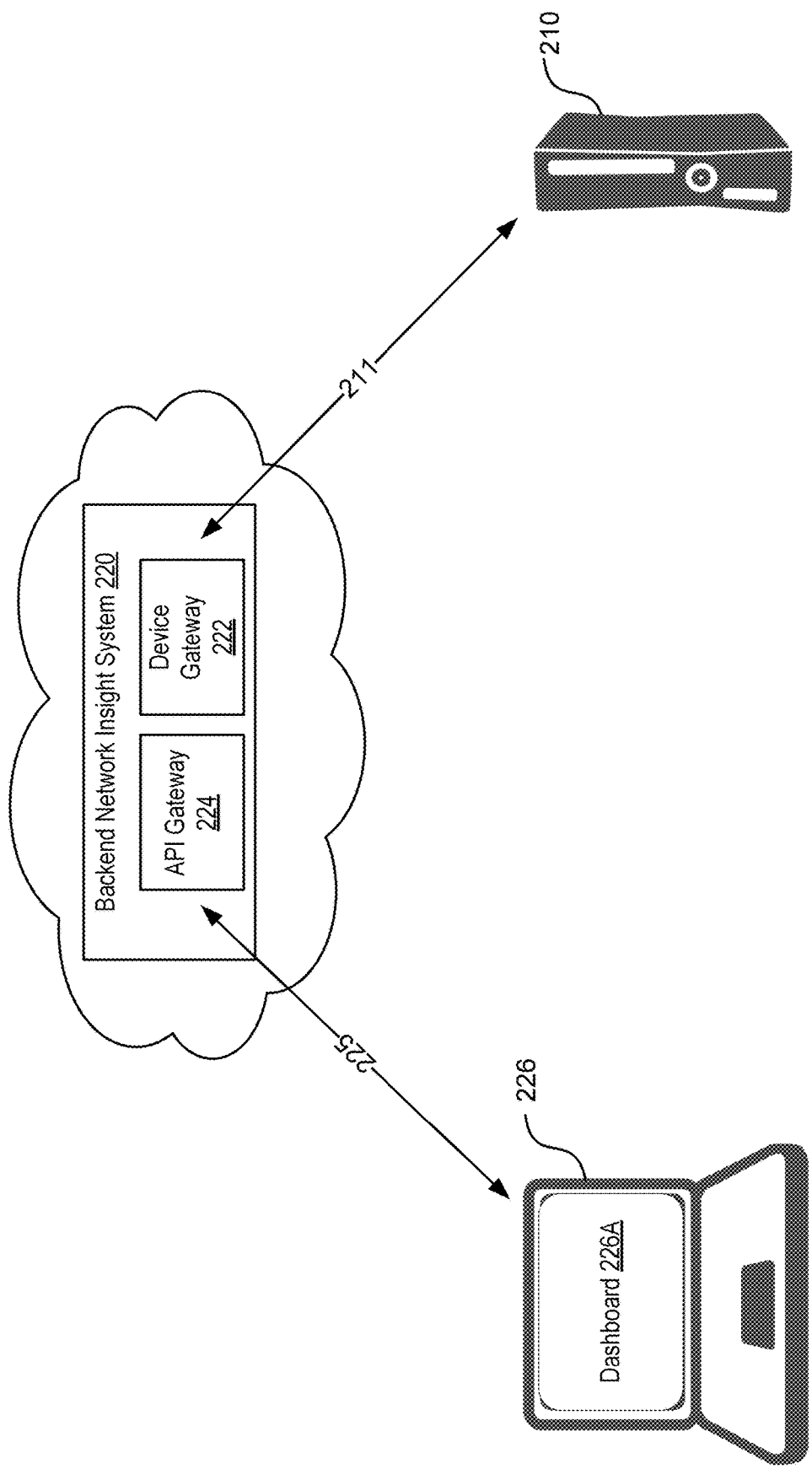
FIG. 7 illustrates an example sensor communicating monitoring/test information or data to backend network insight dashboard system in accordance with some embodiments of the present disclosure.

In some embodiments, backend network insight system 220 may include one or more servers, data stores, and the like. Additionally, backend network insight system 200 may include a device gateway 220A and an application programming interface (API) gateway 220B. Device gateway 220A may be a mechanism/interface for communicating with sensor 210, while API gateway 220B may interface with the aforementioned frontend network insight dashboard system. As will be discussed in greater detail below, backend network insight system 220 may provide information or data from sensor 210 to the frontend network insight dashboard system 226 (FIG. 7). In some embodiments, backend network insight system 220 may process, e.g., filter, convert, translate, etc., the information or data obtained by sensor 210 into a format that can be used by or presented via a dashboard 226A of frontend network insight dashboard system 226.

Network management system 230 may be a cloud-based network management system. In some embodiments, network management system 230 operates to allow users to provision and maintain a network(s), orchestrate operations, control network resources and so on. Like backend network insight system 220, network management system 230 may reside in a public, private, or hybrid cloud, and can be implemented as a controller, an independent server, an independent micro service running on a cloud platform, or running on a traditional, independent server. As will be described in greater detail below, network management system 230 may include a database(s) for storing bootstrapping information associated with sensors, such as sensor 210, which can be used to provision or onboard sensor 210. Such a database(s) may also be used to authenticate sensors, such as sensor 210. It should be understood that configuration and authentication of devices, such as sensor 210 can occur at network management system 230.

In order to facilitate communications between the various components or elements of network 200, network 200 may include one or more APs, such as AP 240, which may be an embodiment of WLAN AP 104 (FIG. 1). In this example, sensor 210 may establish wireless, e.g., 802.11, communications with AP 240 by way of DPP, Wi-Fi® Easy Connect™, or other zero-touch mechanism. This connection can then be leveraged to allow sensor 210 and backend network management insight system 240 to establish communications therebetween without a need for the conventional mechanisms discussed above. Accordingly, a sensor, such as sensor 210 may be installed in network 200 and onboarded without a need for any established Ethernet or cellular connection so that sensor 210 may ultimately establish communications with backend network insight system 220 and receive configuration information or data, as well as send monitor/test data to backend network insight system 220.

Figure 3:
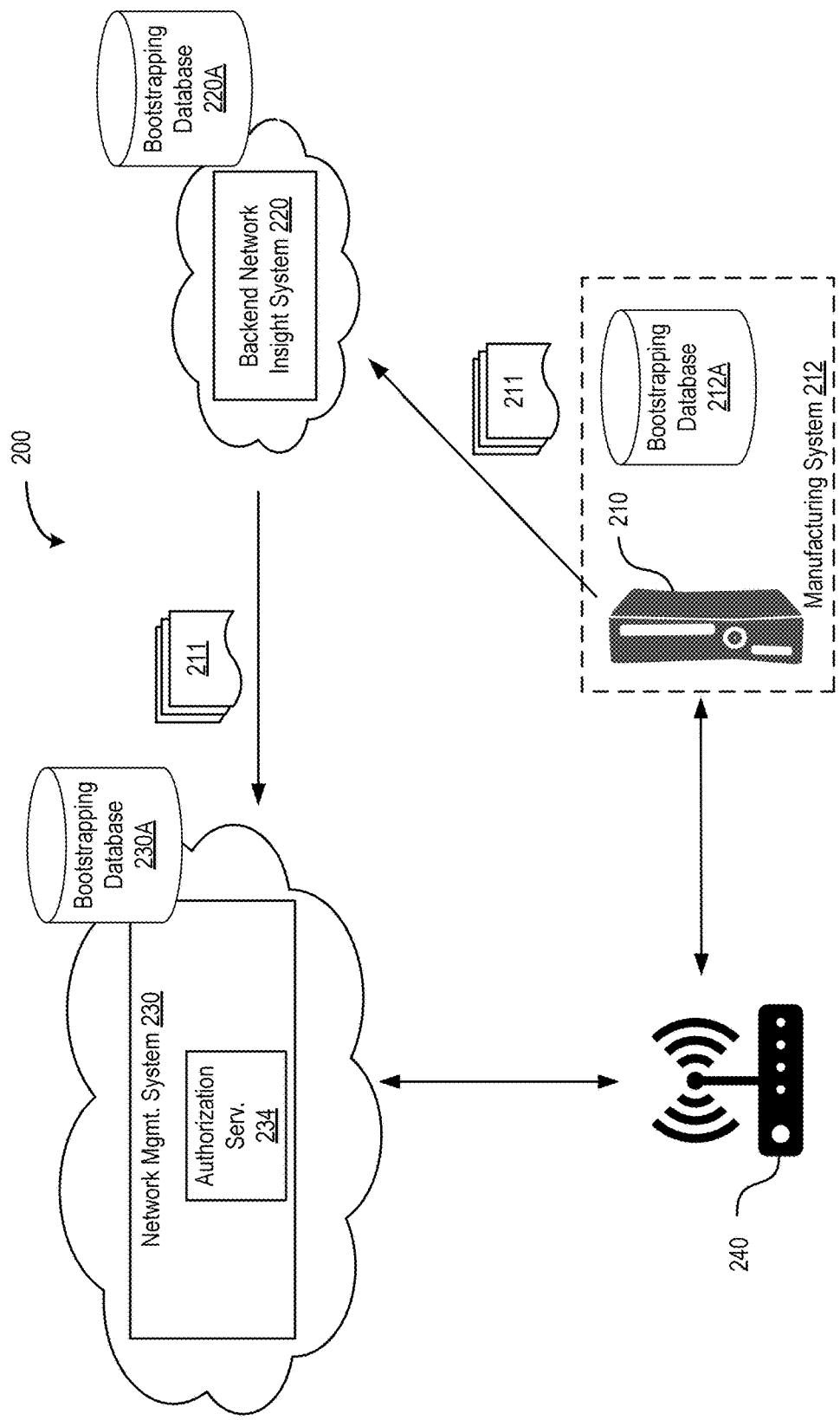
FIG. 3 illustrates a bootstrapping and authentication flow for a sensor in accordance with some embodiments of the present disclosure.

FIG. 3 illustrates a bootstrapping and authentication flow for a sensor, such as sensor 210, in accordance with some embodiments. During manufacturing, packaging, or other "pre-installation" period, a pair of keys specific to sensor 210 may be generated and saved in a memory unit (not shown) of sensor 210. In some embodiments, the key-pair may be an elliptic curve cryptograph (ECC) key-pair, but other types of keys may be used (including but not limited to, e.g., Diffi-Hellman, Rivest Shamir Adleman (RSA), Digital Signal Algorithm (DSA). For example, this key-pair may be stored in a trusted platform module (TPM) chip of sensor 210. The pair of keys may include a public key and a private key. The public key, which at least in part, may make up the aforementioned bootstrapping information associated with sensor 210, can be stored along with sensor 210's serial ID (or other identification information associated with sensor 210) in a bootstrapping database 212A of manufacturing system 212/associated with manufacturing system 212. In some examples, sensor ID information may also or alternatively comprise other identifying information, such as an associated media access control (MAC) address. It should be understood that manufacturing system 212 may store the bootstrapping and identification information 211 of multiple sensors in bootstrapping database 212A. This bootstrapping database 212A (or the contents thereof) may be imported, downloaded, or otherwise obtained by or transmitted to backend network insight system 220, in particular, a bootstrapping database 220A of backend network insight system 220. In turn, backend network insight system 220 may push, e.g., asynchronously in some embodiments, the bootstrapping and device identification information 212 (or bootstrapping database 220A) to bootstrapping database 230A. It should also be understood that bootstrapping information as used herein can encompass both a DPP public key and sensor ID information, e.g., device bootstrapping information, This information 211 can be used for authenticating sensors, including sensor 210, installed in network 200.

Moreover, an authorization mechanism may be effectuated in accordance with some embodiments. The authorization mechanism may be used to limit the installation and use of sensors that are authorized to operate on the network. For example, network management system 230 may apply filtering or security such that only sensors that belong to the same customer to which the network 200 belongs can be automatically provisioned/onboarded in accordance with the various embodiments disclosed herein. In some embodiments, a third-party network may allow for the onboarding of one or more sensors, such as sensor 210 based on authorization logic or control implemented in network management system 230, i.e., authorization service 234. In some examples, the DPP public key may be used to authenticate a first device to the DPP network, whereas a second device may to be instructed to connect to a different WLAN or WLAN SSID. In such a case, authorization service 234 may control the parameters returned by configurator 232.

As discussed above, backend network insight system 220 may push bootstrapping and device identification information 211 to a bootstrapping database 230A of network management system 230. Out-of-band DPP authentication is premised on physical proximity or other physical association between an enrollee and configurator. While this is feasible in smaller, e.g., home networks, the same is not true for larger, enterprise networks, e.g., enterprise WLANs. Accordingly, as also alluded to above, a centralized configurator service may be used to replace the role of a smartphone or other mobile device (e.g., mobile 100 (FIG. 1) as a traditional DPP configurator in accordance with various embodiments of the present disclosure.

Figure 4:
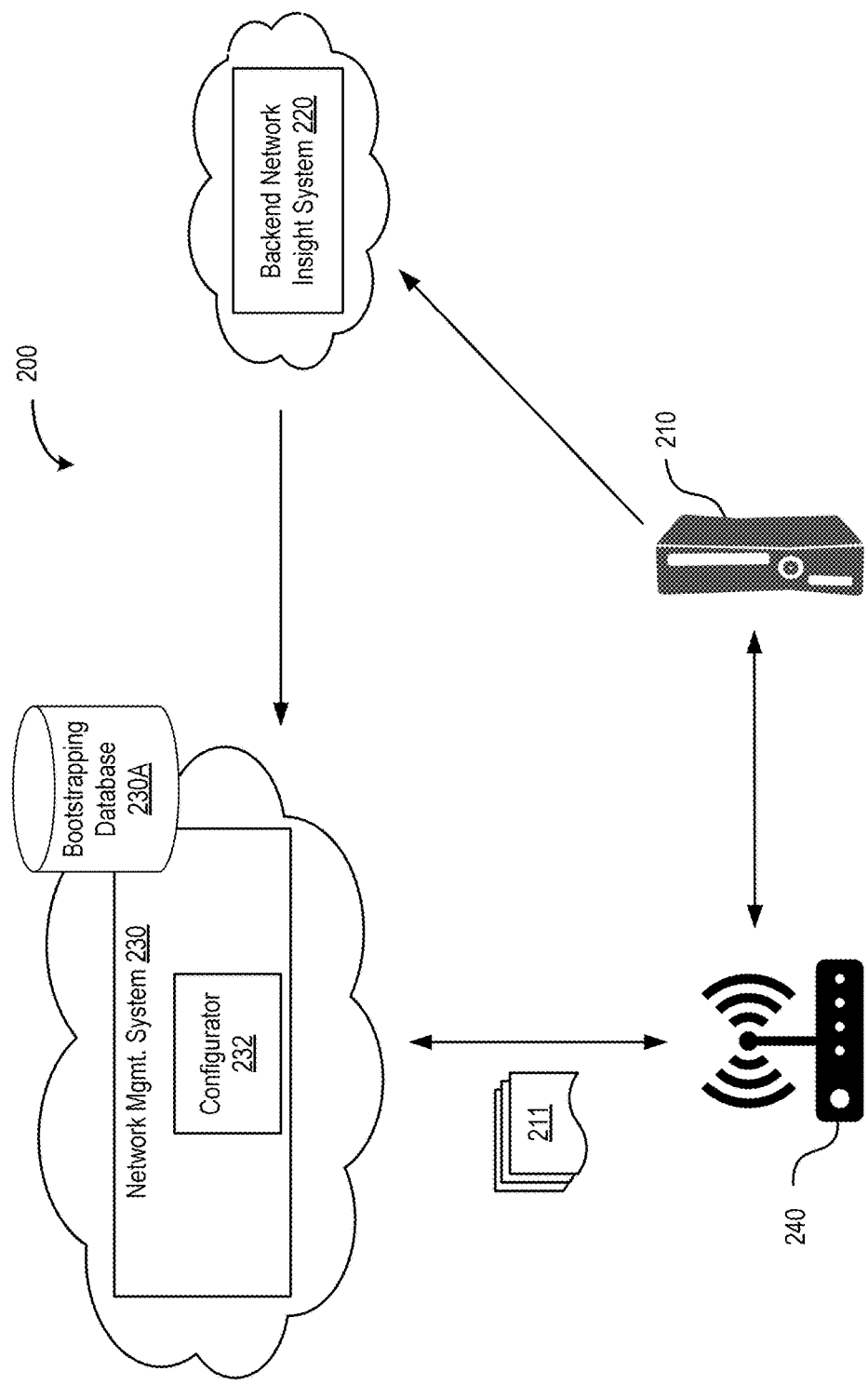
FIG. 4 illustrates an example centralized, cloud-based DPP configurator (and corresponding configuration process) which may be implemented as part of a network management system in accordance with some embodiments of the present disclosure.

FIG. 4 illustrates an example of such a centralized DPP configurator 232 which may be implemented as part of network management system 230, and thus, may also reside in a public, private, or hybrid cloud, and can be implemented as a controller, an independent server, an independent micro service running on a cloud platform, or running on a traditional, independent server. Configurator 232 may, in some embodiments, be an independent server, or a controller.

AP 240 may act as a bridge connecting a wireless network to a wired network. For example, AP 240 can provide access to a wireless network throughout a large area, such as a large building. APs may be distributed throughout an area for which wireless network access is desired such that a client device, such as sensor 210, within the area will generally be within range of one or more of the APs, each AP providing a wireless interface to a wired network.

Like many network devices, a typical AP has a number of configurable settings that affect the way the AP functions and/or how a client or other network device interfaces with the AP. For example, one setting of an access point may specify the channel on which the AP will communicate with client devices. Other settings may specify the type of encryption to be used in communicating with client devices, an encryption key to be used, and a SSID that identifies the network to which the AP provides access. One of the benefits associated with the use of APs in an area is the ability of a client device to seamlessly transition between APs as the client device is moved to different locations within the area.

Configurator 232 is accessible by AP 240 via an intermediate network (not shown), or AP 240 may interact with configurator 232 directly. As noted above, backend network insight system 220 may push bootstrapping and device identification information 211 to a bootstrapping database 230A of network management system 230, which in turn may be transmitted to/downloaded by AP 240.

As described above, the DPP authentication and DPP configuration/provisioning processes involve the exchange of various messages/information between an enrollee and configurator, in this case, between sensor 210 and configurator 232 by way of AP 240. Accordingly, configurator 232 may engage in DPP authentication and DPP configuration processes with sensor 210 as an enrollee. In particular, sensor 210 may indicate its presence periodically via DPP presence announcements or chirps (which AP 240 can hear or sense). If AP 240 has a public key (bootstrapping information) corresponding to or matching that of the DPP presence announcements, handshaking between AP 240 and sensor 210 may commence. In some embodiments, configurator 232/AP 240 may act as the initiator, and issues DPP authentication request frames/messages on channels in the channel list (which can be specified when AP 240 and configurator 232 establish communications). Sensor 210 may check to see if a hash of its public bootstrap key is included in the DPP authentication request message. If so, sensor 210 can derive a first symmetric key, which can be used to obtain a first nonce. Sensor 210 may generate a second nonce, a shared secret, and a second symmetric key, wrapping the first and second nonces along with their respective capabilities in the first symmetric key. Moreover, sensor 210 may wrap an authenticating tag in the second symmetric key, place a hash of its public bootstrap key, among other information including the wrapped authentication tag in a DPP response message that is returned to configurator 232/AP 240. Configurator 232 can validate the DPP response message and transmit a DPP authentication confirmation message to sensor 210 vis-à-vis AP 240.

Following DPP authentication, configurator 232 may configure sensor 210 for communications between it and other network devices, as well as for communications between it and infrastructure devices, in this example, any elements/components of network 200, including backend network insight system 220. Sensor 210 enters into a DPP configuration mode by sending a DPP configuration request message to configurator 232/AP 240. Configurator server 232 responds with a DPP configuration response message, which can be used to provision sensor 210 with the requisite configuration information/credentials needed for sensor 210 to establish secure access/communications with network 200. In other words, sensor 210 may exchange DPP authentication and DPP configuration messaging/information with configurator 232 over a DPP provisioning channel using AP 240 as a relay proxy for the DPP frames used for the exchanging DPP authentication and DPP configuration messaging/information.

Once sensor 210 obtains the requisite DPP configuration objects, sensor 210 is able to discover network 200, e.g., other devices operating in network 200, such as other IoT devices (not shown), other Wi-Fi® clients, and/or other infrastructure devices, e.g., backend network insight system 220, and a connection, e.g., 802.11 connection, can be established between sensor 210 and backend network insight system 220.

Figure 5:
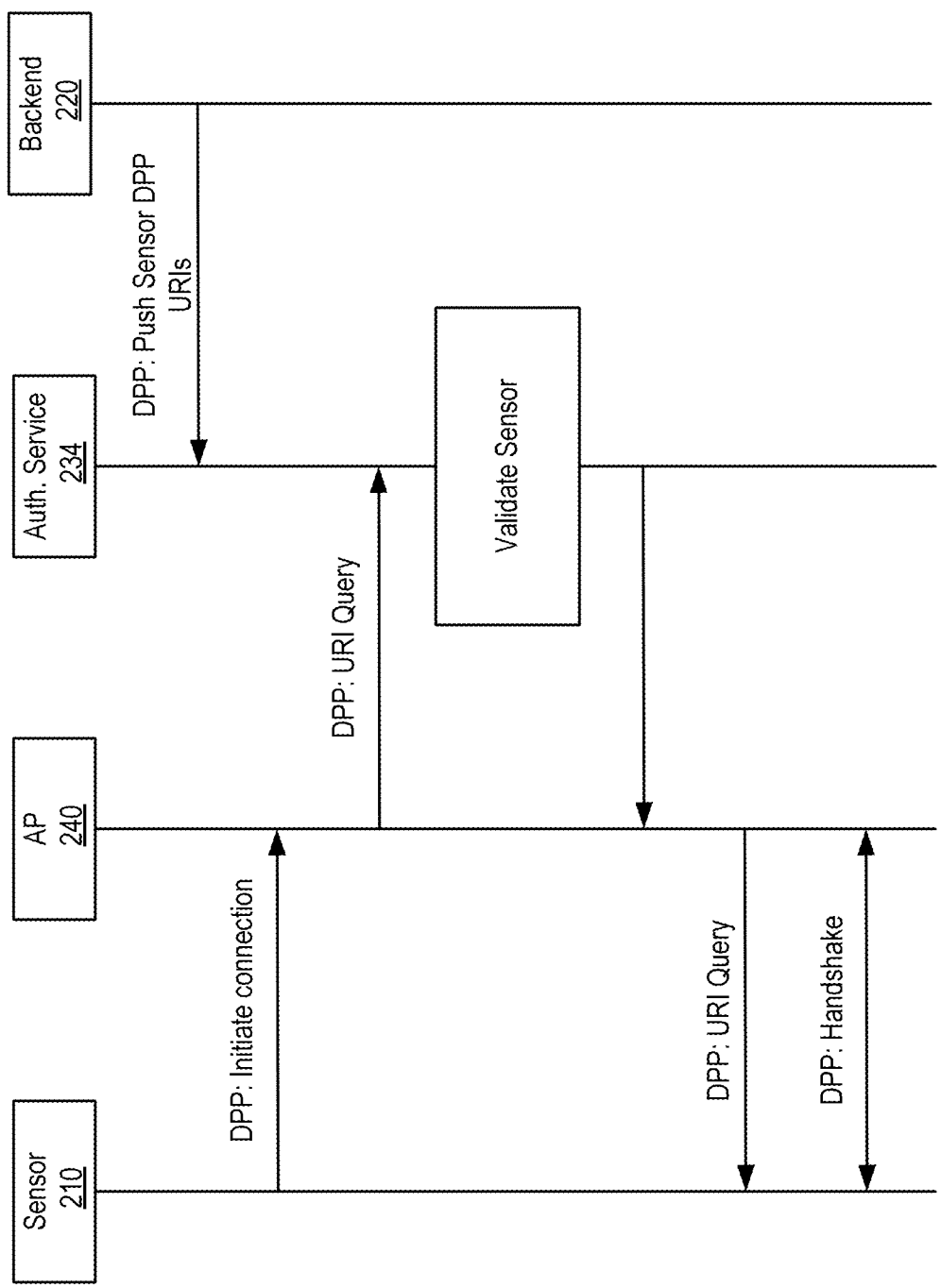
FIG. 5 illustrates an example authorization message flow in accordance with some embodiments of the present disclosure.

As discussed above, in some embodiments, an authorization mechanism may be implemented and used to determine whether or not a sensor, e.g., sensor 210, or other device seeking to connect to and operate on a network, such as network 200, is authorized to do so. As illustrated in FIG. 5, and similar to the above-described process of onboarding and establishing communications with sensor 210, sensor 210 may indicate its presence by the transmission of DPP presence announcements or chirps, and initiate a connection with AP 240. AP 240 may then submit a DPP universal resource indicator (URI) query to authorization service 234 to obtain the DPP URI of sensor 210. As discussed above, authorization service 234 may be implemented on or as part of network management system 230. Periodically, the DPP URIs of sensors, e.g., sensor 210, may be pushed to authorization service 234. It should be understood that authorization of a device, such as sensor 210, may occur after successful authentication of sensor 210. At this point, sensor 210 has proven it is a valid device that can be onboarded using DPP. With some additional customer information gathered from backend network insight system 220, a determination can be made regarding whether there is a WLAN network (e.g., SSID) to which sensor 210 may connect. For example, sensors with certain model names can be specified as being authorized to connect to a particular WLAN SSID, while other sensors or devices can be specified to connect to another one or more WiFi SSIDs.

With the DPP URIs of the sensors (from the backend network insight system 220) and that from AP 240, authorization service 234 may perform validation operations to determine if a sensor, such as sensor 210 requesting to be onboarded is indeed authorized to be onboarded. As also noted above, the logic/operations used to perform the validation can vary depending on the needs of a user(s) of network 200 or other relevant considerations. For example the owner or operator of network 200 may seek to authorize onboarding only for devices that it also owns, or for some particular device(s). The logic/operations can be incorporated into and implemented as part of authenticator 234 of network management system 230. If and when a device, e.g., sensor 210, is authorized, DPP onboarding may proceed by performing DPP authentication between AP 240 and sensor 210, per the bootstrapping information (public key associated with sensor 210). The DPP handshaking may proceed until a connection, e.g., 802.11 connection is established as previously discussed above.

Figure 6A:
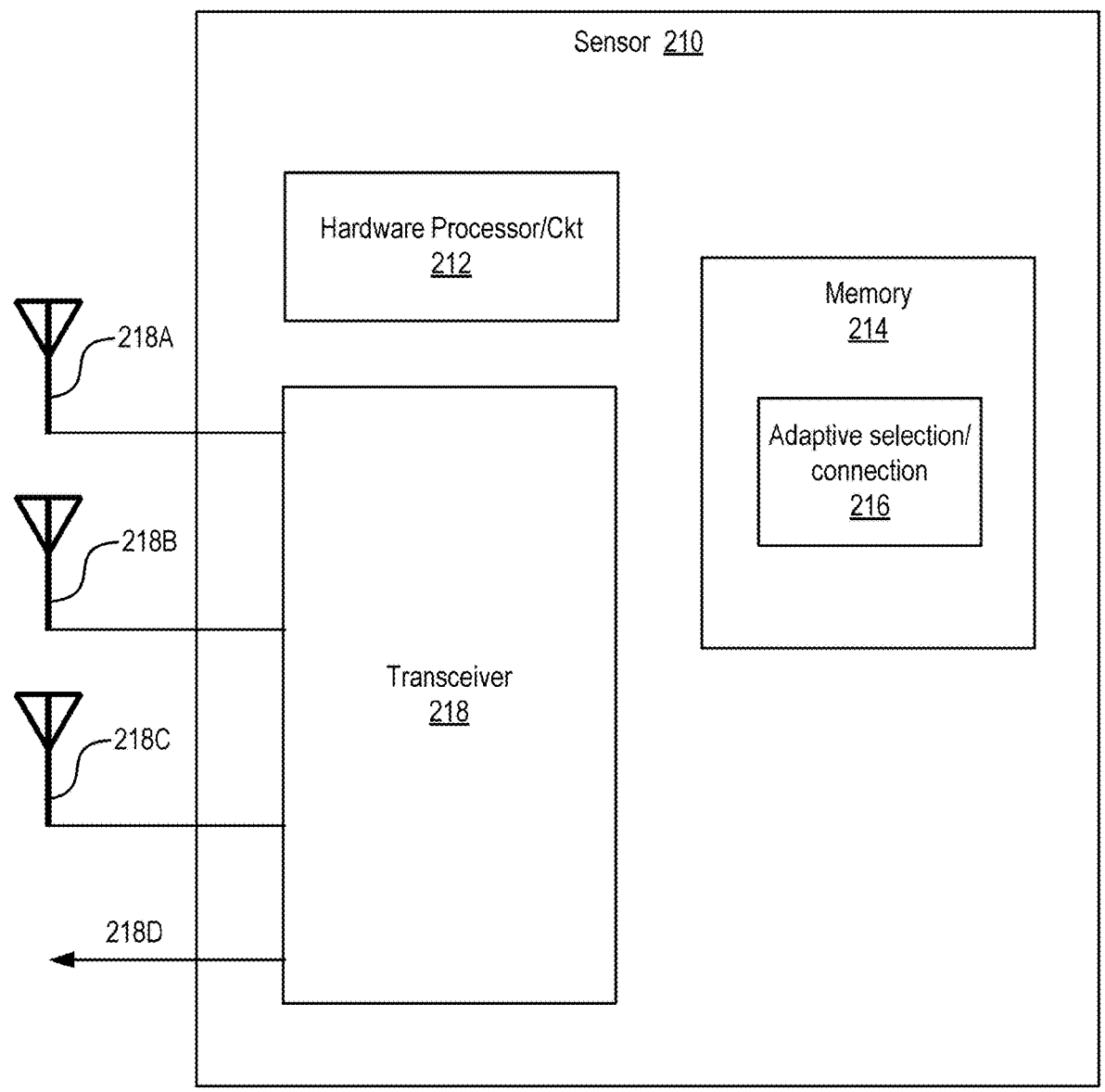
FIG. 6A illustrates an example system/device architecture of a sensor that may be configured/provisioned in accordance with some embodiments of the present disclosure.

FIG. 6A illustrates an example system or device architecture of a sensor, such as sensor 210. FIG. 6A will be described in conjunction with FIG. 6B, which illustrates an example method or set of operations that may be performed by sensor 210 to adaptively select a connectivity mechanism for provisioning sensor 210.

Referring to FIG. 6A, sensor 210 may include a hardware processor 212 and a machine-readable storage medium 214. Hardware processor 212 may be one or more central processing units (CPUs), semiconductor-based microprocessors, and/or other hardware devices, such as circuits, suitable for retrieval and execution of instructions stored in machine-readable storage medium, 214. A machine-readable storage medium, such as machine-readable storage medium 214, may be any electronic, magnetic, optical, or other physical storage device that contains or stores executable instructions. Thus, machine-readable storage medium 214 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 214 may be a non-transitory storage medium, where the term "non-transitory" does not encompass transitory propagating signals. Machine-readable storage medium 214 may be encoded with executable instructions for performing the aforementioned adaptive selection of a connectivity mechanism in the form of adaptive selection/connection logic or algorithm 216. Sensor 210 may further comprise one or more transmitters or receivers for transmitting/receiving information or data, referred to in FIG. 6A as transceiver 218. Devices, such as sensor 210 may support various connectivity mechanisms, including wireless connection mechanisms. Accordingly, operatively connected to transceiver 218 are one or more antennas for communicating vis-à-vis such connectivity mechanisms, e.g., antennas 218A, 218B, and 218C. Each of antennas 218A, 218B, or 218C may support a particular wireless connectivity mechanism, while an interface 218D may support wired connectivity. For example, to support Ethernet communications, interface 218D may comprise a wired Ethernet port.

Figure 6B:
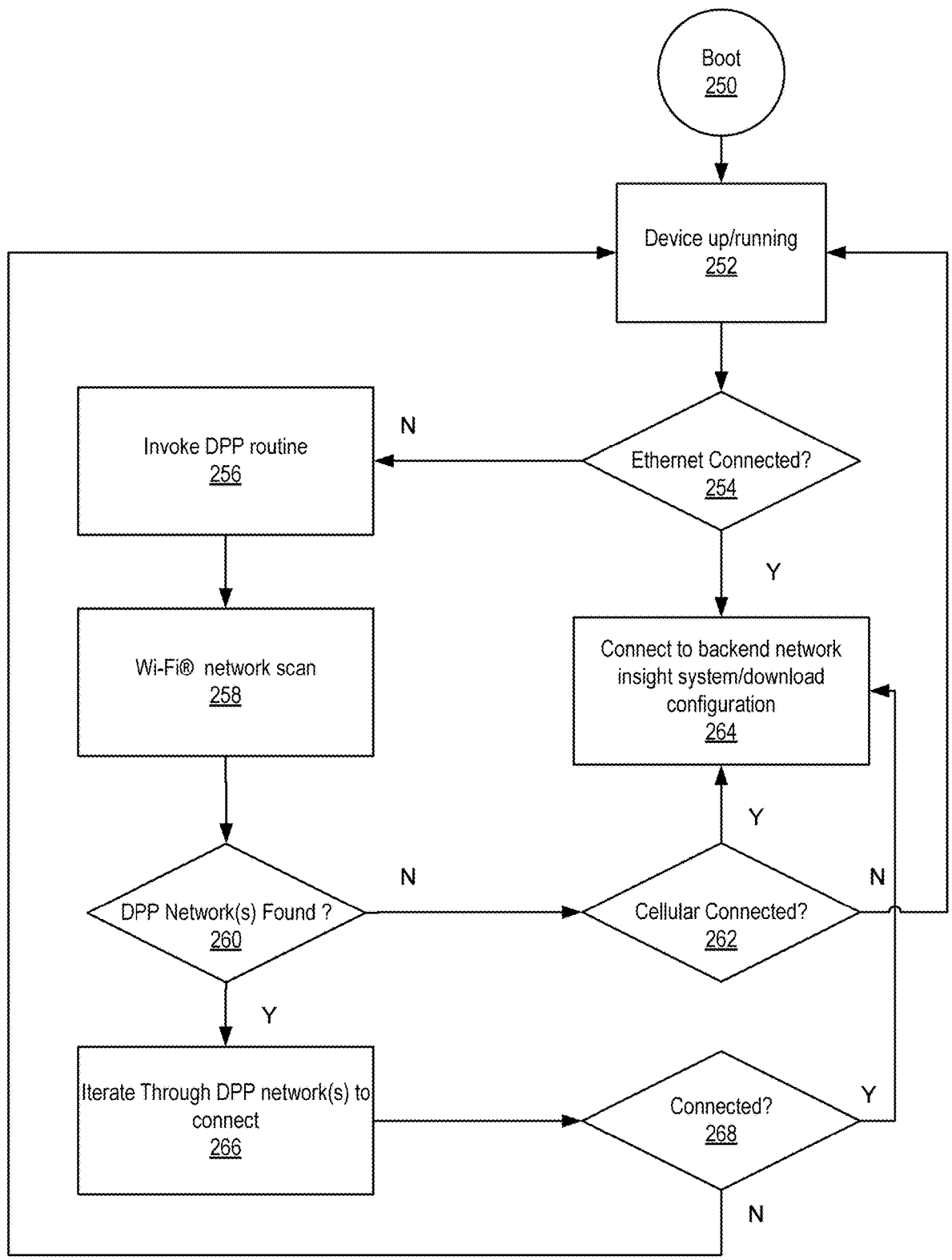
FIG. 6B illustrates a method for adaptively selecting a connectivity mechanism over which onboarding and configuration of a device in accordance with some embodiments of the present disclosure.

FIG. 6B illustrates a method for adaptively selecting a connectivity mechanism over which onboarding and configuration of a device, such as sensor 210, may occur. As discussed above, embodiments of the present disclosure include systems and methods for onboarding a device, such as a sensor, leveraging DPP-over Wi-Fi®. However, in some scenarios, a device, such as sensor 210, may establish a connection to a network over other connectivity mechanisms, e.g., DPP-over Ethernet or DPP-over cellular. Accordingly, in some scenarios, embodiments may select an appropriate or preferred connectivity mechanism leveraging any available connection mechanism.

As illustrated in FIG. 6B, a device, such as sensor 210 may be powered on/booted up at operation 250. When the device is up and running at 252, a check is performed to determine if the device has Ethernet capability. That is, and for example, a check may be performed by adaptive selection/connection component 216 (FIG. 6A) to determine whether a communications connection over interface 218D (which may be an Ethernet interface) has been established at operation 254.

If an Ethernet connection has in fact, been established, the device connects to a backend network insight system, e.g., backend network insight system 220 using the Ethernet connection that was established. As described above, in some networks, such as network 200, the backend network insight system 220 provides configurations to devices, such as sensor 210. That is, sensor 210 may access or download one or more configurations or configuration files that may be the basis for monitoring or testing network 200. Accordingly, at operation 264, the device at issue can connect to the backend network insight system 220, and download any requisite configuration(s).

If there is no Ethernet connection that is or that can be established between network 200 and the device, a DPP provisioning and onboarding routine can be invoked at operation 256. As described above, in such a scenario, DPP-over Wi-Fi® may be used to effectuate a connection, such as an 802.11 communications connection, to the backend network insight system. At operation 258, the device may scan for any available DPP Wi-Fi® network(s). For example, the device may begin transmitting DPP presence announcements If picked up by an AP, the AP, having sensor device and bootstrapping information from a cloud-based configurator, can authenticate the device. That is, if the device finds a DPP network at operation 260, the device can iterate through/establish connections through the DPP network(s) vis-à-vis the aforementioned AP at operation 266. At operation 268, a connection can be established between the device and the backend network insight system to allow configurations to be passed on to the device for use with monitoring or testing of the network, applications running on the network, etc. That is, the method returns to operation 264 for the device to connect to the backend network insight system. If for some reason, a connection cannot be established at this point, the method returns to operation 252, where the method of adaptive selection of connectivity mechanisms can begin again.

On the other hand, if no DPP networks are found at operation 260, the device can attempt to connect over a cellular connection. That is, at operation 262, a check can be performed to determine if the device is connected to or can connect to a cellular network over which configuration information from the backend network insight system can be obtained. If so, again, at operation 268, a connection can be established between the device and the backend network insight system to allow configurations to be passed on to the device for use with monitoring or testing of the network, applications running on the network, etc.

FIG. 7 illustrates an example of sensor 210 communicating monitoring/test information or data to backend network insight dashboard system 226 on or in which a dashboard 226A may be implemented or presented, e.g., to a user. For example, the owner or administrator of network 200 may have an interest in determining the current status/state of network 200, applications running thereon, etc. After establishing a DPP-over Wi-Fi® connection, sensor 210 may then connect to backend network insight system 220 via device gateway 222. In particular, sensor 210 may transmit monitoring or testing information/data 211 to backend network insight system 220. The API gateway 224 of backend network insight system 220 may then forward or transmit the monitoring or testing information/data 225 to dashboard system 226. The monitoring or testing information/data may be presented to a user via dashboard 226A of dashboard system 226 (which may be a computer, workstation, laptop, or other computing/processing system or component capable of receiving and presenting such information/data).

It should be understood that the DPP protocol does not define how a configurator (such as an AP) can obtain bootstrapping info (public key and other information) from an enrollee (such as a sensor). Rather, the DPP protocol relies on out-of-band (OOB) mechanisms such as scanning a QR code, NFC tapping, etc. In contrast, embodiments of the disclosed technology can define or provide a new mechanism with which to push device bootstrapping information to a cloud-based configurator from a backend network insight system.

In some embodiments, an end-to-end workflow of generating a device's bootstrapping (or other) information at the time of manufacturing, providing it to a backend network insight system, and then pushing it to a cloud-based configurator (which in some embodiments can be implemented in a cloud-based network management system) securely.

Further still, some embodiments may include the selection of a connectivity mechanism for provisioning a device, such as a sensor. Such sensors may be provisioned using DPP-over Wi-Fi®, Ethernet, Bluetooth® Low Energy, or cellular, based on deployment. DPP allows for the onboarding of any client device that matches the relevant key pair. An AP will provision the 802.11 network credentials into the device, and the device can initiate a connection to the network. By adding an authorization mechanism (for example, based on customer ID), APs will not provision the devices in certain cases, as desired. Embodiments of the disclosed technology can increase the security aspects of DPP by adding a cloud-based mechanism where only the authorized devices are onboarded to a network.

Figure 8:
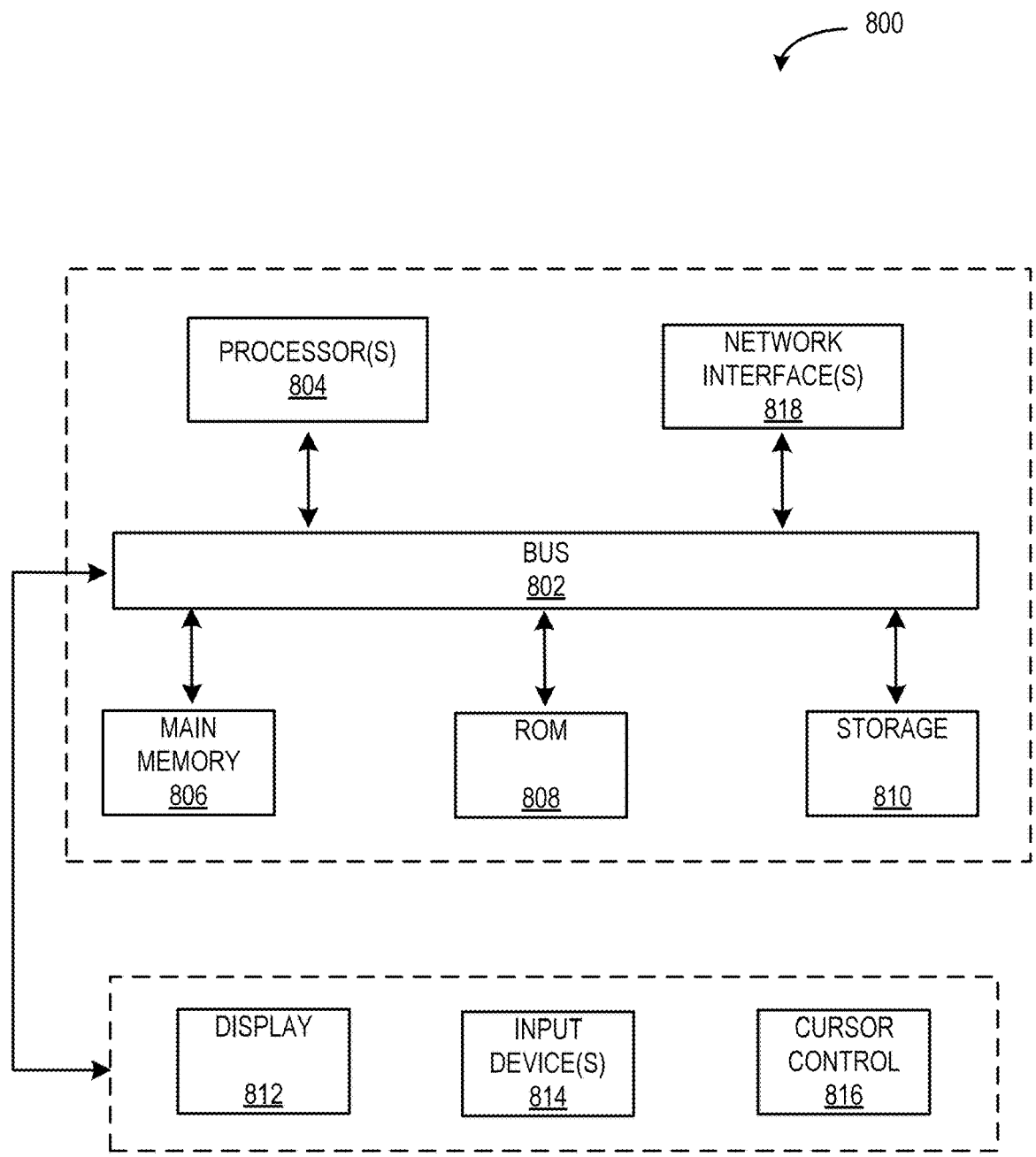
FIG. 8 is an example computing component that may be used to implement various features of embodiments described in the present disclosure.

FIG. 8 depicts a block diagram of an example computer system 800 in which various of the embodiments described herein may be implemented. Computer system 800 may be an embodiment of sensor 210, AP 240, as well as one or more components of network 200, e.g., backend network insight system 220, frontend network insight dashboard system 226, and so on. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

What is claimed is:

1. A network device operable on a network, comprising:
    a processor; and
    a memory operatively connected to the processor and including instructions that when executed, cause the processor to:
        determine whether the network device can connect to the network via device-resident Ethernet communications and whether the network device can connect via Wi-Fi;
        responsive to a determination that the network device cannot connect to the network via device-resident Ethernet communications and can connect via Wi-Fi, automatically and without user intervention invoke zero touch provisioning to
            onboard the network device to operate on the network by communicating with an intermediate network device operative on the network using authentication information associated with the network device, wherein the intermediate device, prior to determining whether the network device can connect to the network via device-resident Ethernet communications, receives bootstrapping information of the network device, wherein the authentication information is based on the bootstrapping information, and wherein the authentication information authenticates the network device to the backend insight system;
            connect to a backend network insight system via the intermediate network device and the network; and
            configure the network device based on operating parameters received from the backend network insight system; and
        operate on the network in accordance with the operating parameters.

2. The network device of claim 1, wherein the memory includes instructions that when executed, further cause the processor to:
  determine whether the network device can connect to the network via Wi-Fi; and
  responsive to determining that the network device cannot connected to the network via Wi-Fi, determine whether the network device has resident communications capabilities to connect to the network via cellular communications or near-field communications capabilities.

3. The network device of claim 1, wherein the instructions that cause the processor to onboarding the network device comprise engaging in an authentication procedure with the intermediate network device.

4. The network device of claim 3, wherein the authentication procedure comprises one of a Device Provisioning Protocol (DPP) authentication procedure or a Wi-Fi EasyConnect authentication procedure.

5. The network device of claim 3, wherein the memory includes instructions that when executed, further cause the processor to configure itself for communications with the intermediate network device and establish a Wi-Fi connection therewith.

6. The network device of claim 1, wherein the intermediate device, prior to the network device determining whether the network device can connect to the network via device-resident Ethernet communications, receives identification information associated with the network device.

7. The network device of claim 1, wherein the bootstrapping information associated with the network device is received from the backend network insight system.

8. The network device of claim 1, wherein the memory includes instructions that when executed, further cause the processor to authorize the network device for use on the network following authentication of the network device.

9. The network device of claim 1, wherein the instructions that cause the processor to invoke zero touch provisioning is based on scanning for available wireless local area networks (WLANs).

10. A method, comprising:
  determining whether a network device can connect to a network via device-resident Ethernet communications and whether the network device can connect via Wi-Fi;
  based on a determination that of the network device cannot connect to the network via device-resident Ethernet communications and can connect via Wi-Fi, automatically and without user intervention:
  invoking zero touch provisioning to onboard the network device to operate on the network by communicating with an intermediate network device operative on the network using authentication information associated with the network device, wherein the intermediate device, prior to the determining whether the network device can connect to the network via device-resident Ethernet communications, receives bootstrapping information of the network device, wherein the authentication information is based on the bootstrapping information, and wherein the authentication information authenticates the network device to the backend insight system;
    connecting the network device to a backend network insight system via the intermediate network device and the network; and
    configuring the network device based on operating parameters received from the backend network insight system; and
  operating the network device on the network in accordance with the operating parameters.

11. The method of claim 10, further comprising:
  determining whether the network device has resident communications capabilities to connect to the network via cellular communications or near-field communications capabilities.

12. The method of claim 10, wherein onboarding the network device comprises:
  engaging in an authentication procedure with the intermediate network device.

13. The method of claim 12, wherein the authentication procedure comprises one of a Device Provisioning Protocol (DPP) authentication procedure or a Wi-Fi EasyConnect authentication procedure.

14. The method of claim 12, further comprising:
  configuring the network device for communications with the intermediate network device and establish a Wi-Fi connection therewith.

15. The method of claim 10, wherein the intermediate device receives the bootstrapping information and identification information associated with the network device from the backend network insight system.

16. The method of claim 10, further comprising:
  authorizing the network device for use on the network following authentication of the network device.

17. A sensor operable on a network, comprising:
  a processor; and
  a memory operatively connected to the processor and including instructions that when executed, cause the processor to:
    determine whether the sensor can connect to the network via device-resident Ethernet communications and whether the sensor can connect via Wi-Fi;
    based on a determination that the sensor that the network device cannot connect to the network via device-resident Ethernet communications and can connect via Wi-Fi, automatically and without user intervention:
      invoke zero touch provisioning,
      transmit a presence announcement message to at least an intermediate network device operative on the network, and
      engage in an authentication procedure with the intermediate network device using authentication information associated with the network device, the intermediate network device having, prior to the determining whether the sensor can connect to the network via device-resident Ethernet communications, received bootstrapping information associated with the sensor from a backend network insight system, wherein the backend network insight system stores bootstrapping information for a plurality of network devices, wherein the authentication information is based on the bootstrapping information, and wherein the authentication information authenticates the network device to the backend insight system;
    connect to the backend network insight system via the intermediate network device and the network; and
    configure the sensor based on operating parameters received from the backend network insight system; and
  operate on the network in accordance with the operating parameters.

18. The sensor of claim 17, wherein the authentication procedure comprises one of a Device Provisioning Protocol (DPP) authentication procedure or a Wi-Fi EasyConnect authentication procedure.

\* \* \* \* \*